United States Patent [19]

Muto

[11] Patent Number: 4,836,619
[45] Date of Patent: Jun. 6, 1989

[54] ANTI-LOCK CONTROL METHOD FOR VEHICLE

[75] Inventor: Tetsuji Muto, Tochigi, Japan

[73] Assignee: Honda Giken Kogyo Kabushiki Kaisha, Tokyo, Japan

[21] Appl. No.: 148,764

[22] Filed: Jan. 26, 1988

[30] Foreign Application Priority Data

Jan. 26, 1987 [JP] Japan ................... 62-15477

[51] Int. Cl.$^4$ ............... B60T 8/66; B60T 8/70
[52] U.S. Cl. ..................... 303/109; 303/96; 303/105; 364/426.02; 188/181 C
[58] Field of Search ........ 303/95, 96, 97, 99, 303/103, 105, 106, 108, 109, 111; 180/197; 188/181 A, 181 C; 364/426, 426.02, 426.03

[56] References Cited

U.S. PATENT DOCUMENTS

| 3,667,813 | 6/1972 | Burckhardt et al. | 303/96 |
| 3,832,008 | 8/1974 | Leiber et al. | 303/96 |
| 4,338,667 | 7/1982 | Cook et al. | 303/109 X |
| 4,729,608 | 3/1988 | Fennel et al. | 303/106 |
| 4,738,491 | 4/1988 | Sato | 303/109 X |

Primary Examiner—Andres Kashnikow
Assistant Examiner—Timothy Newholm
Attorney, Agent, or Firm—Lyon & Lyon

[57] ABSTRACT

A vehicular anti-lock control method including the steps of comparing a wheel speed with a reference value which is based on a vehicle speed estimated from the wheel speed, judging the locking tendency of a wheel from the result of such comparison and reducing a brake pressure to be applied to the wheel which is on the way to locking, a first vehicle speed is estimated based on the speed of a wheel including a driving wheel and a second vehicle speed is estimated based on the speed of a follower wheel, the driving wheel being judged to be in a racing state when the first vehicle speed is larger than the second vehicle speed above a predetermined value. When the driving wheel is racing, the first vehicle speed is held constant and as far as such racing is present the constant vehicle speed is used to determine the reference value for comparison with the wheel speed.

3 Claims, 4 Drawing Sheets

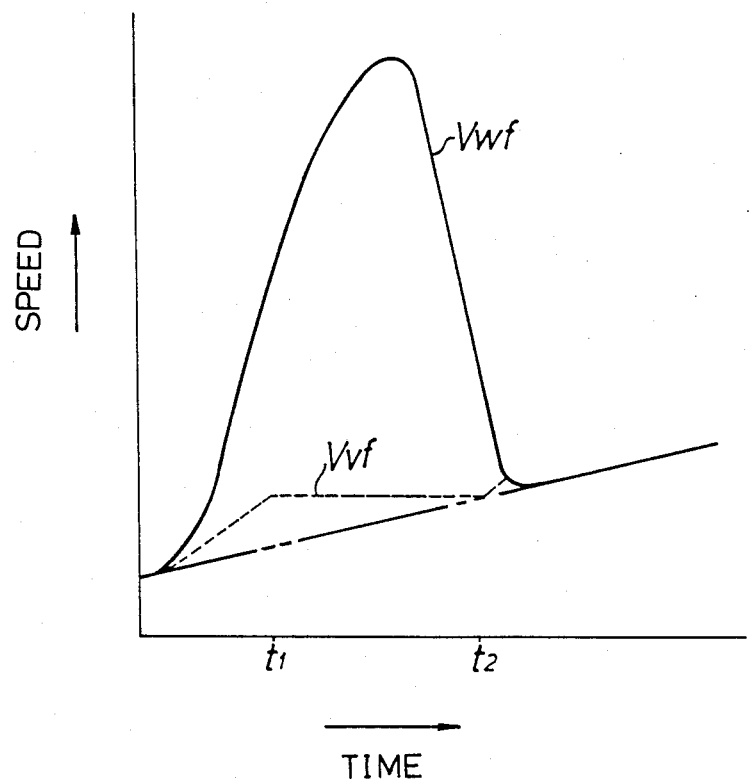

4,836,619

ANTI-LOCK CONTROL METHOD FOR VEHICLE

BACKGROUND OF THE INVENTION

1. Field of the Invention

The present invention relates to an anti-lock control method for vehicles including the steps of estimating a vehicle speed by integrating the speed of a wheel, comparing the wheel speed with a reference value derived from such an estimated vehicle speed to judge whether or not a wheel is going into a locked condition and, when it is judged that the wheel is entering a locked condition, reducing a braking pressure to a wheel brake.

2. Description of the Prior Art

Such a method has conventionally been made known from, for example, Japanese patent publication No. 47010/1981.

However, such conventional prior art method uses a plurality of wheel speeds including the speed of a driving wheel when estimating a vehicle speed. If the driving wheel falls into a racing condition, the prior art method estimates a vehicle speed at a higher level than the actual one permitting anti-lock control operation to be performed at unnecessary stages. Accordingly, it is desirable that the vehicle speed be avoided from being estimated at a higher level by detecting a racing condition of the driving wheel.

SUMMARY OF THE INVENTION

The invention has been proposed in view of these circumstances and has as its object the provision of an anti-lock control method for vehicles wherein the wheel racing can be detected easily.

Further object of the invention is to provide an anti-lock control method for vehicles adapted to avoid estimating a vehicle speed at a level higher than the actual one when the wheel racing occurs.

In order to achieve the above objects, according to the invention, there is proposed an anti-lock control method for a vehicle including the steps of estimating a first vehicle speed on the basis of the speed of a wheel including at least a driving wheel and estimating a second vehicle speed on the basis of the speed of a follower wheel, judging the driving wheel to be in a racing state when said first estimated vehicle speed is higher than said second estimated vehicle speed by not less than a predetermined value, and utilizing the result of the judgment in controlling of a brake pressure fed to a wheel brake.

When the driving wheel falls into a racing state, the rotational speed of the wheel including at least the driving wheel increases abruptly and accordingly the first estimated vehicle speed increases greatly. Therefore, the driving wheel can be judged to be in a racing state when the first vehicle speed exceeds the second vehicle speed by not less than a predetermined value.

Further according to the invention, there is proposed an anti-lock control method for a vehicle including the steps of keeping constant the level of a vehicle speed which is estimated on the basis of the speed of a wheel including at least a driving wheel when the driving wheel is racing, and using such constant vehicle speed for determining a reference value to be compared with a wheel speed as far as the racing state of the driving wheel persists.

With the afore-mentioned methods, it is avoided to estimate a vehicle speed at an undesirably higher level when a driving wheel falls into a racing state, thus preventing unnecessary anti-lock control operation from being effected.

The above and other objects, features and advantages of the invention will be apparent from reading of the following detailed description of a preferred embodiment made in conjunction with the accompanying drawings.

BRIEF DESCRIPTION OF THE DRAWINGS

The drawings show one embodiment according to the invention, in which

FIG. 3 is a circuit diagram used to estimate vehicle speeds and FIG. 4 is a characteristic view of an estimated vehicle speed.

DESCRIPTION OF THE PREFERRED EMBODIMENT

Figure 1:
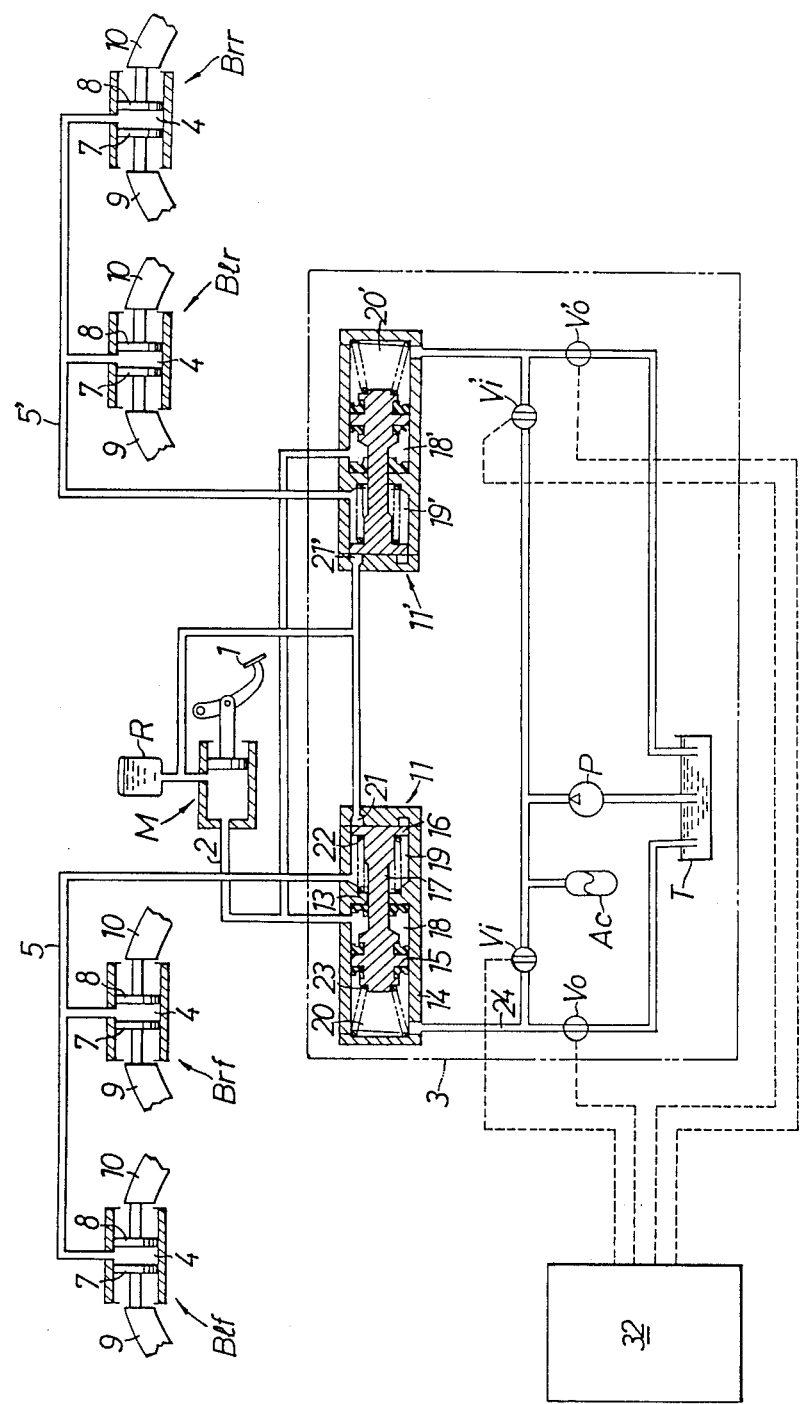
FIG. 1 is a diagram of a hydraulic circuit.

One embodiment of the invention will now be described hereinafter with reference to the attached drawings. First referring to FIG. 1, a brake pedal 1 is operatively connected to a master cylinder M. When a driver depresses the brake pedal 1 down, the master cylinder M generates a hydraulic pressure in an oil passage 2. The oil passage 2 is connected to a hydraulic control circuit 3 which outputs a hydraulic brake pressure in response to the pressure generated in the oil passage 2.

A vehicle has left and right driving wheels and left and right follower wheels and wheel brakes are provided for respective driving and follower wheels. Hydraulic brake pressures outputted from the hydraulic control circuit 3 are supplied to the wheel brakes. When the vehicle is of a front wheel drive type, for example, its left and right front wheels are driving wheels and they are equipped with a left front wheel brake Blf and a right front wheel brake Brf, respectively. Left and right rear wheels of the vehicle, as follower wheels in this illustrated embodiment, are equipped with a left rear wheel brake Blr and a right rear wheel brake Brr, respectively. The brakes Blf, Brf, Blr and Brr are, for example, constructed into drum brakes. The left and right front wheel brakes Blf and Brf have respective brake chambers 4 which are connected to an oil passage 5 leading from the hydraulic control circuit 3 while the left and right rear wheel brakes Blr and Brr similarly have brake chambers 4 which are connected to an oil passage 5' leading from the hydraulic control circuit 3.

At respective brakes Blf, Brf, Blr and Brr, if hydraulic brake pressures are fed to their chambers 4, pistons 7 and 8 are actuated to move apart from each other urging brake shoes 9 and 10 into contact with a brake drum, not shown, thereby producing a brake torque. If the hydraulic brake pressure in the brake chamber 4 should go excessively high, the brake torque generated between the brake shoes 9, 10 and the brake drum will become too large, resulting in a locked condition of the associated wheel. In order to deal with this, when a wheel is going into a locked condition, the hydraulic control circuit 3 operates to reduce the hydraulic brake pressure whereby the wheel is prevented from being locked.

The hydraulic control circuit 3 includes a modulator 11 associated with the left and right front wheel brakes Blf and Brf and a modulator 11' associated with the left and right rear wheel brakes Blr and Brr and these modulators 11 and 11' have the basically same construction. Therefore, only one modulator 11 will be described its detailed construction in the following.

The modulator 11 comprises a cylinder 14 which has opposite end walls thereof closed and a hollow interior divided at its intermediate portion by a partition wall 13, and a rod 17 having a pair of pistons 15 and 16 formed at opposite ends thereof, the rod 17 having a portion intermediate between the pistons 15 and 16 which axially slidably penetrates through the partition wall 13. A cylinder chamber is defined between the partition wall 13 and one piston 15 to serve as a primary hydraulic brake pressure chamber 18 which is connected to the master cylinder M via the oil passage 2. Another cylinder chamber is defined between the partition wall 13 and the other piston 16, which serves as a secondary hydraulic brake pressure chamber 19 and is connected to the brake chambers 4, 4 of left and right front wheel brakes Blf and Brf through the oil passage 5. An anti-lock hydraulic control pressure chamber 20 is defined between one end wall of the cylinder 14 and the one piston 15 and an open chamber 21 is defined between the other end wall of the cylinder 14 and the other piston 16. The open chamber 21 is connected to a reservoir R of the master cylinder M. Housed in the secondary hydraulic brake pressure chamber 19 is a spring 22 which biases the piston 16 in a direction moving apart from the partition wall 13. In the anti-lock hydraulic control pressure chamber 20 is housed a spring 23 which biases the piston 15 toward the partition wall 13.

To the anti-lock hydraulic control pressure chamber 20 is connected an oil passage 24 which is connected via a normally-closed inlet valve Vi to an oil pump P and via a normally-open outlet valve Vo to an oil tank T. An accumulator Ac is connected to an oil passage between the inlet valve Vi and the oil tank T.

Similarly in the other modulator 11', a primary hydraulic brake pressure chamber 18' is connected to the master cylinder M and a secondary hydraulic brake pressure chamber 19' is connected to the brake chambers 4, 4 of left and right rear wheel brakes Blr and Brr via the oil passage 5'. An open chamber 21' is connected to the reservoir R. Furthermore, an anti-lock hydraulic control pressure chamber 20' is connected via a normally-closed inlet valve Vi' to the oil pump P and via a normally-open outlet valve Vo' to the oil tank T.

The inlet valves Vi, Vi' and the outlet valves Vo, Vo' are solenoid valves and are opened and closed under control of a control means 32.

In a state where the inlet valves Vi, Vi' are closed and the outlet valves Vo, Vo' are open, the interiors of anti-lock hydraulic control pressure chambers 20, 20' are released to the oil tank T. If the brake pedal 1 is depressed down and the hydraulic pressure from the master cylinder M is supplied into the primary hydraulic brake pressure chambers 18, 18' in this state, the volumes of secondary hydraulic brake pressure chambers 19, 19' are reduced to feed into the brake chambers 4, 4. of respective brakes Blf, Brf, Blr and Brr the hydraulic brake pressures proportional in level to the pressure generated from the master cylinder M. Accordingly, the torque generated at the time of braking can freely increase in response to the braking operation of a driver.

Now if the outlet valves Vo, Vo' are closed with the inlet valves Vi, Vi' being held closed, the control oil within the anti-lock hydraulic control pressure chambers 20, 20' becomes confined therein so that the secondary hydraulic brake pressure chambers 19, 19' of respective modulators 11, 11' are kept with their volumes invariable irrespective of increase or decrease in the hydraulic pressures fed to the primary hydraulic brake pressure chambers 18, 18'. As a cosequence, the braking torque is maintained at a constant level without being affected by the braking operation of a driver. This operation applies to the case where the possibility of a wheel locking arises.

Furthermore, if the inlet valves Vi, Vi' are opened and the outlet valves Vo, Vo' are closed, anti-lock hydraulic control pressures are supplied into the anti-lock hydraulic control pressure chambers 20, 20'. Owing to these pressures, irrespective of the hydraulic pressure from the master cylinder M prevailing in the primary hydraulic brake pressure chambers 18, 18', the volumes of the secondary hydraulic brake pressure chambers 19, 19' increase to reduce the pressures within the brake chambers 4 . . . of respective wheel brakes Blf, Brf, Blr and Brr, thus weakening the braking torque. Accordingly, by opening the inlet valves Vi, Vi' and closing the outlet valves Vo, Vo' when a wheel is on the way to locking, the wheel can be avoided from entering a state of locking.

Figure 2:
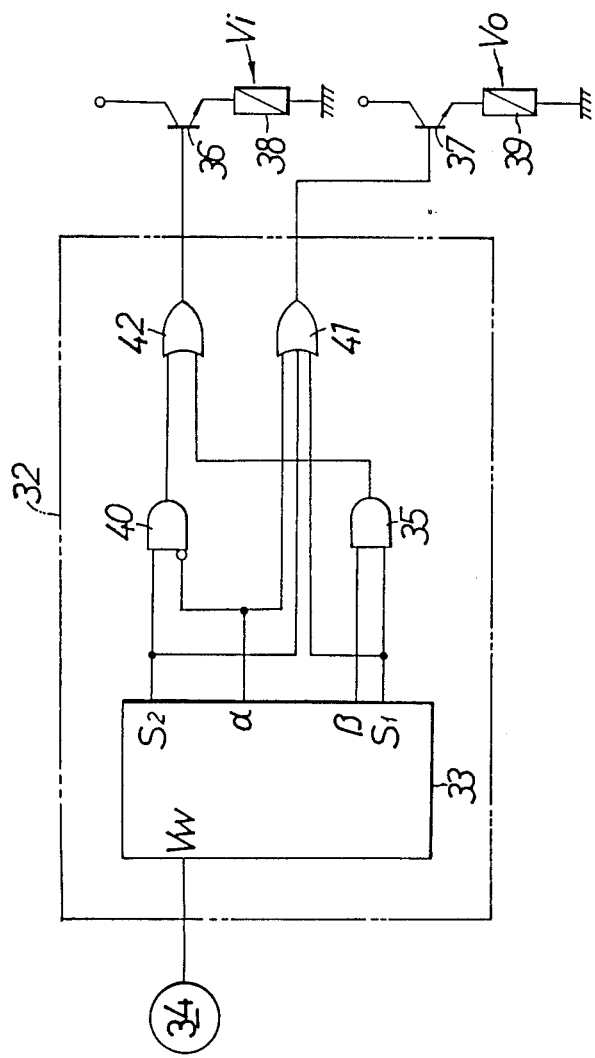
FIG. 2 is a simplified circuit diagram showing the arrangement of a control means.

Referring to FIG. 2, the basic arrangement of the control means 32 will be described below. Since the construction for controlling one inlet valve Vi and one outlet valve Vo which are associated with one pair of wheel brakes Blf and Brf is basically the same as that for controlling the other inlet valve Vi' and outlet valve Vo' associated with the other pair of wheel brakes Blr and Brr, the construction for controlling the one valves Vi and Vo will be described only in the following.

The control means 32 includes a decision circuit 33 which is used to judge whether or not a wheel is in a locked state and, as a result of such judgment, to output signals for opening and closing the inlet valve Vi and the outlet valve Vo.

It should be noted here that the establishment of the following conditions (a) and (b) may operate the control means 32 so as to judge that a wheel is entering a locked state and cause a brake pressure to be reduced:

(a) a wheel acceleration $\dot{V}w <$ a reference wheel deceleration $-\dot{V}wo$;

(b) a wheel speed $Vw <$ a first reference wheel speed $Vr_1$.

When assuming that a vehicle speed is identified by $Vv$ and a reference slip rate for a wheel by $\lambda_1$, the relationship of $Vr_1 = Vv \cdot (1 - \lambda_1)$ is obtained. Therefore, if a slip rate of the wheel is identified by $\lambda$, the above relationship of $Vw < Vr_1$ has the same meaning as $\lambda > \lambda_1$.

The decision circuit 33 is inputted from a wheel speed detector 34 with a signal indicative of the wheel speed $Vw$. When the condition $\dot{V}w < -\dot{V}wo$ is satisfied, the decision circuit 33 outputs a signal $\beta$ and when the condition $Vw < Vr_1$ is satisfied, it outputs a signal $S_1$.

These signals $\beta$ and $S_1$ are inputted to an AND gate 35 and when both signals become high in level, a transistor 36 is conducted and a solenoid 38 is energized thereby opening the inlet valve Vi. Outputting the signal S of a high level also causes a transistor 37 to be conducted and a solenoid 39 to be energized so that the outlet valve Vo is closed.

When the signals $\beta$ and $S_1$ are generated so as to reduce or weaken the brake torque in the afore-mentioned manner, the wheel speed is on the way to reduction. This means that the braking torque is still larger than the driving torque given from the road surface and therefore that the fear of wheel locking has not been eliminated completely at this stage. Though this control system can normally provide a good result because of some time delay, such as 10 ms, appearing in operation of the system which would cause the brake pressure to be reduced further after falling of such brake pressure-reducing signals, there may be, however, expected another possibility that the degree of reduction of the brake pressure has been insufficient for some reason, for example, due to road conditions and the wheel speed may continue to show a locking tendency. In order to overcome this problem, it can be arranged to output a brake pressure-reducing signal continuously until the wheel speed Vw surely changes into an increasing phase as far as the condition $\lambda > \lambda_1$ is present. In this case, however, the brake pressure-reducing signal is kept valid until a condition of $\dot{V}w > 0$ is obtained, in spite of the fact that a good control effect is normally achieved even if the output of such brake pressure-reducing signal is stopped at the instant of $\dot{V}w > -\dot{V}wo$. This poses a disadvantage that the brake torque may be reduced excessively, though this problematic aspect can be disregarded in practical use for the wheels that are subject to a smaller part of distribution of the braking load.

In view of these, there is further set a second reference wheel speed $Vr_2$ which corresponds to a second reference slip rate $\lambda_2$ having a relationship of $\lambda_2 > \lambda_1$ and it is proposed to output the brake pressure-reducing signal until the wheel speed Vw changes into an increasing phase but only in the presence of a condition of $Vw < Vr_2$ or $\lambda > \lambda_2$ indicating a high possibility of wheel locking. In other words, the decision circuit 33 judges whether or not the condition $Vw < Vr_2$ or $\lambda > \lambda_2$ is satisfied and when it is satisfied, the circuit 33 outputs a signal $S_2$. Also, a reference wheel acceleration $+\dot{V}wo$ is set to judge whether the wheel speed Vw is increasing or not and if $\dot{V}w > +\dot{V}wo$, the circuit 33 outputs a signal $\alpha$.

The signal $S_2$ is inputted to one input terminal of an AND gate 40 and also to an OR gate 41. The signal $\alpha$ is inputted to the OR gate 41 and in an inverted manner to the AND gate 40. The signal $S_1$ is also inputted to the OR gate 41 of which output is in turn fed to the base of transistor 37. Outputs of both AND gates 35 and 40 are inputted to an OR gate 42 which then outputs a signal to the base of transistor 36.

With the control means 32 constructed above, if either of the signals $S_1$, $\alpha$ and $S_2$ becomes high, the transistor 37 is conducted and the outlet valve Vo is closed. If the signals $\beta$ and $S_1$ are both high or if the signal $S_2$ is high and simultaneously the signal $\beta$ is low, the inlet valve Vi is made open.

Next explanation will be made as to how the first and second reference wheel speeds $Vr_1$ and $Vr_2$ are set. These are ideally determined by detecting a vehicle speed V and incorporating the reference slip rates $\lambda_1$ and $\lambda_2$ into the value of vehicle speed V while using the following equations:

$$Vr_1 = V(1 - \lambda_1) \quad (1)$$

$$Vr_2 = V(1 - \lambda_2) \quad (2)$$

Figure 3:
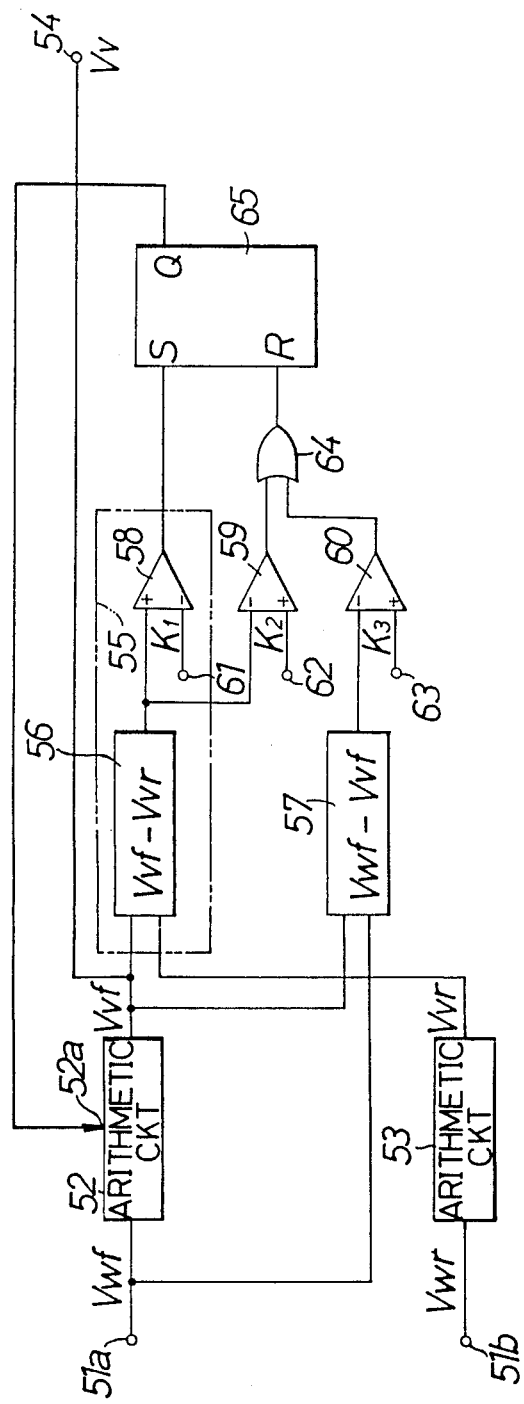

However, no practical means has been provided heretofore to detect the vehicle speed V and therefore, according to a preferred form of the present invention, a provisional vehicle speed Vv is obtained by a circuit shown in FIG. 3.

In FIG. 3, a pair of input terminals 51a and 51b are provided and they receive inputs indicative of the speed Vwf of a driving wheel and the speed Vwr of a follower wheel, respectively. One input terminal 51a is connected to a first arithmetic circuit 52 and the other input terminal 51b is connected to a second arithmetic circuit 53.

Both the arithmetic circuits 52 and 53 have integrators therein and the wheel speeds inputted thereto are integrated in Order to estimate vehicle speeds Vvf and Vvr, respectively. Moreover, the first arithmetic circuit 52 has a control input terminal 52a and is operable to keep its output, that is, the estimated vehicle speed Vvf constant when a signal of high level is inputted to the control input terminal 52a. Such invariable state in level of the vehicle speed Vvf is released when the control input terminal 52a receives a signal of low level.

The first arithmetic circuit 52 has an output terminal connected to an output terminal 54, a first subtracter 56 of a racing detector circuit 55 and also to a second subtracter 57. Output terminal of the second arithmetic circuit 53 is connected to the first subtracter 56. The input terminal 51a is also connected to the second subtracter 57. From the output terminal 54 is supplied an estimated vehicle speed Vv, that is, the estimated vehicle speed Vvf as an output of the first arithmetic circuit 52. The racing detector circuit 55 comprises the first subtracter 56 and a comparator 58. The first subtracter 56 carries out a subtraction of Vvf−Vvr and a result thereof is inputted to a non-inverted input terminal of the comparator 58 and to an inverted input terminal of another comparator 59. Further at the second subtracter 57, a subtraction of Vwf−Vvf is carried out and the resultant output from this second subtracter 57 is inputted to an inverted input terminal of a comparator 60.

To an inverted input terminal of the comparator 58 is inputted a signal of such level corresponding to a reference value $K_1$, for example, 2 km/h, from a reference value input terminal 61. Accordingly, in the racing detector circuit 55, when the result of subtracting operation of the first subtracter 56, that is, the difference between one vehicle speed Vvf derived from the driving wheel speed Vwf and the other vehicle speed Vvr derived from the follower wheel speed Vwr becomes larger than the reference value $K_1$, it is judged that the driving wheel is racing and the output of comparator 58 rises to a high level.

The comparator 59 has a non-inverted input terminal to which is inputted a signal of such level corresponding to a reference value $K_2$, for example, 2 km/h, from a reference value input terminal 62. Also the comparator 60 has a non-inverted input terminal which receives a signal having a level corresponding to a reference value $K_3$ such as 2 km/h from a reference value input terminal 63. Consequently, when the subtracting operation of Vvf−Vvr provides a resultant value not more than the reference value $K_2$, the comparator 59 outputs a high level of signal and when the subtracting operation of Vwf−Vvf carried out at the second subtracter 57 results in a value not more than the reference value $K_3$, the comparator 60 outputs a high level of signal. That is, when $(Vvf - Vvr) \leq K_2$, it indicates that the driving wheel is not in a racing state and then the output of comparator 59 assumes a high level. When $(Vwf-Vvf) \leq K_3$, it indicates that the driving wheel speed Vwf has been decelerated and the driving wheel has gone out of a racing state, rendering the output of comparator 60 high.

A flip-flop 65 is provided to have a set-output terminal Q connected to the control input terminal 52a of first arithmetic circuit 52, a set-input terminal S connected to the output terminal of comparator 58 and a reset-input terminal R which is connected via OR gate 64 to the output terminals of comparators 59 and 60.

The operation of this embodiment will next be described. When the driving wheel is not racing, the output of racing detector circuit 55 assumes a low level and the output of OR gate 64 assumes a high level so that the flip-flop 65 outputs a low level signal from its set-output terminal Q. This allows the first arithmetic circuit 52 to carry out a normal integrating operation thereby to estimate the vehicle speed Vvf on the basis of the driving wheel speed Vwf. The thus-estimated vehicle speed Vvf is used as a vehicle speed Vv for determining reference values $Vr_1$ and $Vr_2$.

With also reference to FIG. 4, supposing that the driving wheel has fallen into a racing condition and its speed Vwf is increasing abruptly. In this case, at time $t_1$ when the condition $Vvf - Vvr > K_1$ is satisfied, the output of comparator 58 rises to a high level and accordingly the output of flip-flop 65 appearing at its set-output terminal Q becomes high. Thereby, at the first arithmetic circuit 52, the output or vehicle speed Vvf is made constant and the estimated vehicle speed Vvf of such constant value is used as the vehicle speed Vv to set the reference values $Vr_1$ and $Vr_2$. In consequence, it is avoided to estimate the vehicle speed Vv at a higher level and unnecessarily carry out an anti-lock control operation.

At time $t_2$ when the driving wheel speed Vwf has decreased to satisfy the condition of $Vwf - Vvf \leq K_3$, the output of OR gate 64 becomes high to place the output of the set-output terminal Q of flip-flop 65 at low level. Therefore, the first arithmetic circuit 52 is allowed to carry out a normal integrating operation in estimating the vehicle speed Vv and the anti-lock control operation is effected in a normal manner at the time of braking.

As another embodiment according to the invention, the wheel speeds of a driving wheel and a follower wheel may be inputted to the control input terminal 51a.

What is claimed is:

1. An anti-lock control method for a vehicle equipped with wheels including a driving wheel and a follower wheel, the method comprising the steps of integrating a wheel speed to estimate a vehicle speed, comparing said wheel speed with a reference value derived from said estimated vehicle speed to judge whether the wheels are entering a locked state, and reducing a brake pressure to a wheel brake when said wheels are entering a locked state, wherein said vehicle speed comprises a first vehicle speed and a second vehicle speed, said first vehicle speed being estimated on the basis of a speed of at least one wheel including at least said driving wheel, said second vehicle speed being estimated on the basis of a speed of said follower wheel, wherein said driving wheel is judged to be in a racing state when said first estimated vehicle speed is larger than said second estimated vehicle speed above a predetermined value, thereby utilizing the result of said judgment in controlling of said brake pressure, and wherein when said driving wheel is judged to be in a racing state, said first estimated vehicle speed is kept constant and such constant vehicle speed is used to determine said reference value.

2. A method according to claim 1, wherein when it is judged that said driving wheel is not in a racing state, said reference value is determined on the basis of said first estimated vehicle speed.

3. An anti-lock control method for vehicle equipped with wheels including a driving wheel, the method comprising the steps of integrating a wheel speed to estimate a vehicle speed, comparing said wheel speed with a reference value derived from said estimated vehicle speed to judge whether the wheels are entering a locked state, and reducing a brake pressure to a wheel brake when said wheels are entering a locked state, wherein said vehicle speed is estimated on the basis of a speed of at least one wheel including at least said driving wheel and wherein said estimated vehicle speed is kept constant when said driving wheel is in a racing state, and such constant vehicle speed is used to determine said reference value as far as the racing state of said driving wheel is present, wherein said vehicle has a follower wheel and a second vehicle speed is estimated from a speed of said follower wheel, and a difference between the second estimated vehicle speed and the vehicle speed estimated on the basis of the speed of the at least one wheel including at least the driving wheel being utilized to judge whether said driving wheel is in a racing state.

* * * * *